(12) United States Patent
Leynaert

(10) Patent No.: US 6,654,267 B2
(45) Date of Patent: Nov. 25, 2003

(54) POWER SUPPLY APPARATUS PROVIDING PLURAL OUTPUTS OF SPECIFIC CHARACTERISTICS

(75) Inventor: Francois Noël Leynaert, Montmorency (FR)

(73) Assignee: Labinal, Montigny-de-Bretonneux (FR)

( * ) Notice: Subject to any disclaimer, the term of this patent is extended or adjusted under 35 U.S.C. 154(b) by 0 days.

(21) Appl. No.: 10/057,000

(22) Filed: Jan. 31, 2002

(65) Prior Publication Data

US 2002/0136039 A1 Sep. 26, 2002

(30) Foreign Application Priority Data

Feb. 2, 2001 (FR) ............................................. 01 01448

(51) Int. Cl.⁷ ............................................. H02M 3/335
(52) U.S. Cl. ...................................... 363/95; 363/21.01
(58) Field of Search ............................... 363/16, 20, 95, 363/97, 98, 21.01

(56) References Cited

U.S. PATENT DOCUMENTS 6,154,374 A     11/2000  Uejima et al.

6,172,883 B1     1/2001  Kates et al.

FOREIGN PATENT DOCUMENTS

EP          0 939 483 A2      9/1999

*Primary Examiner*—Adolf D. Berhane
(74) *Attorney, Agent, or Firm*—Larson & Taylor, PLC

(57) ABSTRACT

The power supply apparatus (10) comprises an input (12), first and second outputs (14, 16) and conversion circuit (18) for conversion of the electric current which are connected between the input (12) and the outputs (14, 16). The conversion circuit (18) comprises a transformer (20) comprising a primary winding (20A) supplied by the input electric current and first and second secondary windings (20B, 20C) respectively supplying the first and second outputs (14, 16) by way of first and second shaping circuits (22, 24). The first shaping circuit (22) comprises a regulating circuit (48) adapted to act on the electric current feeding the primary winding (20A). The regulating circuit (48) is adapted to effect regulation in dependence on a signal from the first shaping circuit (22). The second shaping circuit (24) comprises autonomous circuitry (86, 88) for regulating the current provided by the second output (16).

6 Claims, 1 Drawing Sheet

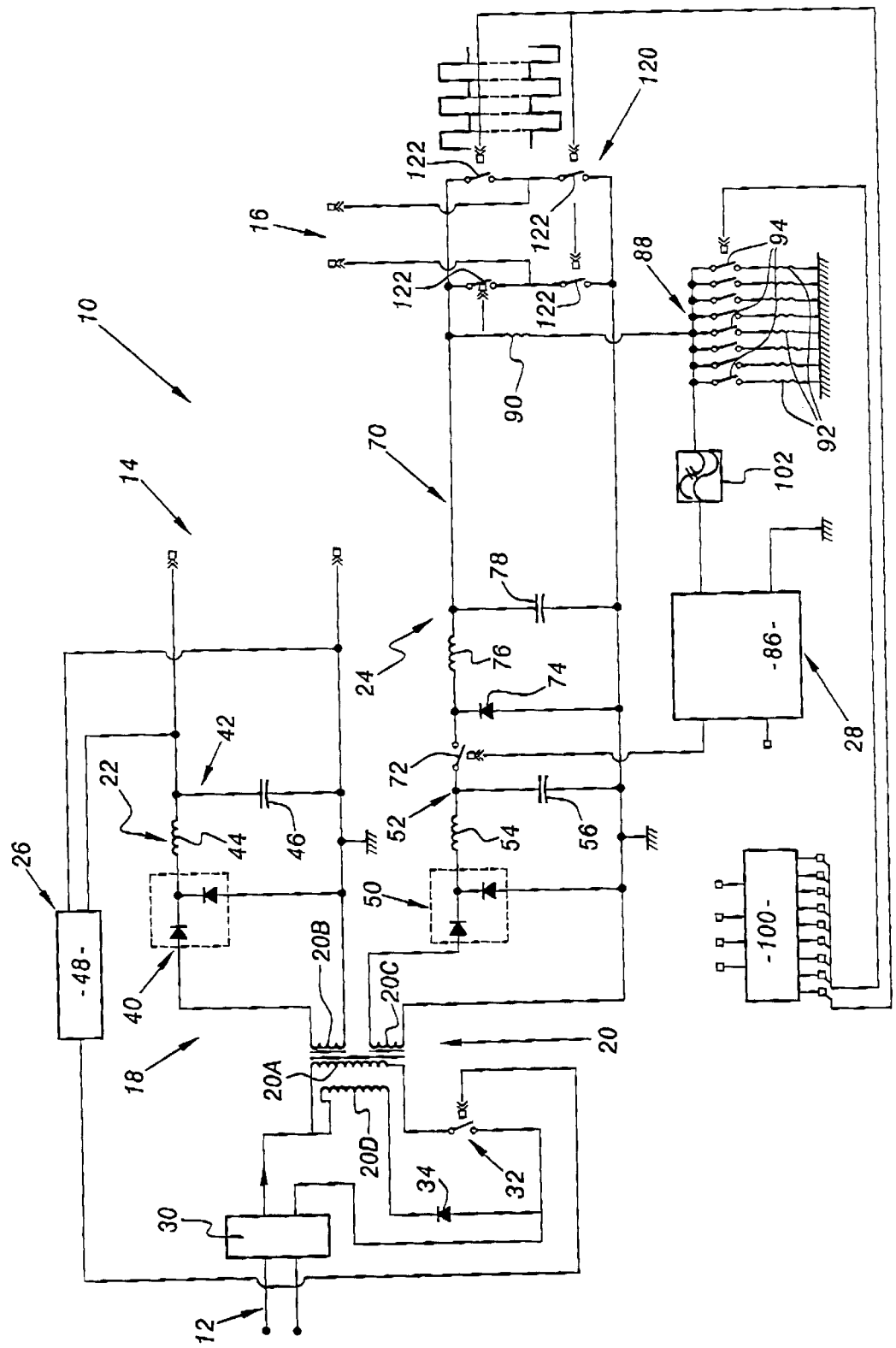

POWER SUPPLY APPARATUS PROVIDING PLURAL OUTPUTS OF SPECIFIC CHARACTERISTICS

BACKGROUND OF THE INVENTION

The present invention concerns a power supply apparatus intended in particular to be used in an aircraft. It concerns more particularly a power supply apparatus of the type comprising:

an input for receiving an input electric current;

first and second outputs for providing first and second electric power supply currents each having specific characteristics; and means for conversion of the electric current connected between said input and said first and second outputs.

It is nowadays necessary in aircraft cabins to supply electrical energy to different operational members which are available to passengers. Those operational members are formed for example by video screens, lamps, power supply sockets for portable computers as well as electrical actuators which are fitted in the seats in order to ensure independent displacement of different movable components of the seat.

Those operational members are supplied with power from the electric power distribution system of the aircraft, which conventionally delivers an alternating current at 115 volts, at a frequency of 400 Hz.

Numerous operational members require a power supply with alternating current at 110 volts, at a frequency of 60 Hz for their operation. On the other hand, for safety reasons, other operational members such as the motors of the actuators which are fitted in the seats are direct-current devices. Their power supply voltage is generally 12 or 24 volts.

It is known to connect to the electric power distribution system installed in the aircraft a converter for implementing conversion of the alternating current into direct current. To supply alternating current to the operational members requiring such a power supply another converter is used. That provides for conversion of the distributed alternating current into an alternating current of different voltage and frequency.

Thus, the known solution involves using a plurality of converters each incorporating a transformer. Those converters are each connected to the electric power distribution system of the aircraft. That power supply architecture is relatively bulky and increases the total weight involved in the power supply.

SUMMARY OF THE INVENTION

The object of the invention is to propose a power supply apparatus of reduced bulk and weight, which makes it possible to supply power to a plurality of types of operational members from electric currents of different characteristics.

For that purpose the invention concerns a power supply apparatus of the above-mentioned type, in which said conversion means comprise a transformer comprising a primary winding supplied by the input electric current and first and second secondary windings respectively feeding the first and second outputs by way of first and second shaping circuits, the primary winding and the first and second secondary windings being disposed on the same magnetic circuit, the first shaping circuit comprising regulating means adapted to act on the electric current supplying the primary winding, which regulating means are adapted to ensure regulation in dependence on a signal from the first shaping circuit, and the second shaping circuit comprising autonomous means for regulation of the current produced by the second output, said second shaping circuit being adapted to produce an alternating current; and the second shaping circuit comprising a rectification stage and, at the output of said rectification stage, means for modifying the voltage in accordance with a variable division ratio:

In accordance with particular embodiments the apparatus comprises one or more of the following features:

said first shaping circuit is adapted to produce a direct current;

said means for modifying the voltage in accordance with a variable division ratio comprise a regulator for the output voltage of said means for modifying the voltage in accordance with a variable division ratio and means for controlling said regulator on the basis of a variable control voltage;

said means for controlling a variable control voltage comprise a variable-ratio voltage divider bridge connected at the output of said means for modifying the voltage in accordance with a variable division ratio;

said second shaping circuit comprises at the output of said means for modifying the voltage in accordance with a variable division ratio an inverter bridge controlled at a predetermined frequency; and said means for modifying the voltage in accordance with a variable division ratio are adapted to produce a periodic signal of a frequency double the alternating current produced at the output of the second shaping circuit.

The invention also relates to a method of converting an electric current from an input of a power supply apparatus receiving an input electric current, to first and second output electric currents each having specific characteristics.

BRIEF DESCRIPTION OF THE DRAWING

The invention will be better appreciated from the description set forth hereinafter solely by way of example and with reference to the single FIGURE which is a diagrammatic view of a power supply apparatus according to the invention.

DESCRIPTION OF THE PREFERRED EMBODIMENTS

The power supply apparatus 10 illustrated in drawings is intended to be installed in an aircraft. It comprises an input 12 for receiving an input electric current. That input is intended to be connected to the electrical energy distribution system of the aircraft. That system provides for example an alternating current at a voltage of 115 volts and at a frequency of 400 Hz.

The power supply apparatus 10 further comprises two outputs. A first output 16 is adapted to supply loads such as electrical actuators with a 24 volt dc voltage. The second output 16 is adapted to supply loads such as video screens with an ac voltage at 110 volts at a frequency of 60 Hz Means 18 for conversion of the electric current are interposed between the input 12 and the first and second outputs 14 and 16.

The conversion means 18 comprise a single transformer 20 comprising a primary winding 20A and two secondary windings 20B, 20C. Those secondary windings 20B, 20C respectively supply the outputs 14 and 16 by way of shaping circuits respectively identified at 22 and 24.

The first shaping circuit 22 comprises regulating means 26 acting on the current supplying the primary winding 20A of the transformer. The regulating means 26 are adapted to ensure regulation in dependence on the signal from the first shaping circuit and in particular its output 14.

The second shaping circuit 24 comprises autonomous regulating means which are specific to that shaping circuit.

The transformer 20 is for example a direct transformer, generally referred to as a 'forward transformer'.

The primary winding 20A of the transformer is connected to the output terminals of a shape factor corrector 30 which is supplied from the input 12 of the apparatus.

The shape factor corrector 30 is intended to bring into phase the strength and the voltage supplied by the electrical distribution system and to convert the alternating current of the system Into a direct current whose voltage is equal to 225 V.

A switching member 32 is disposed between the primary winding 20A and the output of the shape factor corrector 30 in order to selectively control the feed to the primary winding 20A from the shape factor corrector 30.

In addition, and as is known per se, the transformer 20 comprises a demagnetisation winding 20D connected in parallel by way of a diode 34 with the output terminals of the shape factor corrector.

The shaping circuit 22 comprises a rectification stage 40 formed by two diodes connected in series and in opposite relationship across the terminals of the first secondary winding 20B. One of the terminals of the first secondary winding 20B is connected to earth.

A filtering cell 42 is connected at the output of the rectification stage 40. The filtering cell 42 is formed by a winding 44 and a capacitor 46 which are connected in series and connected between the output of the rectification stage formed between the two diodes and earth.

The first output 14 is formed at the terminals of the capacitor 46.

The regulating means 26 comprise a regulator 48 of conventional type such as a pulse width modulation regulator (PWM). The input of the regulator 48 is connected to the terminals of the first output 14.

The output of the regulator 48 is connected to the control terminal of the switching member 32 in order to ensure selective connection of the primary winding 20A to the output of the shape factor corrector 30. The control frequency of the switching member 32 which is imposed by the regulator 48 is for example 170 kHz.

The primary winding 20A and the first secondary winding 20B of the transformer are dimensioned and the regulator 48 is adapted in such a way that the voltage across the terminals of the first output 14 is equal to 24 volts, The transformer then operates with a cycle ratio of 40%.

The second shaping circuit 24 is connected to the output of the second secondary winding 20C of the transformer. The circuit 24 further comprises at its input a rectification stage 50 similar to the stage 40 of the first circuit 22. The rectification stage 50 thus comprises two diodes connected in series and in opposite relationship across the terminals of the second secondary winding 20C.

A filtering cell 52 is provided at the output of the rectification stage 50. The filtering cell 52, like the cell 42, is formed by a coil 54 and a capacitor 56 which are connected in series between ground and the central point of the two diodes. The filtering cell 52 is adapted to smooth the voltage produced at the output of the rectification stage 50.

The primary winding 20A and the second secondary winding 20C of the transformer as well as the elements of the filtering cell 52 are adapted to produce at the terminals of the capacitor 56 a dc voltage of substantially 180 volts.

A stage 70 for reducing the voltage in accordance with a variable division ratio is connected at the output of the rectification stage 50 and the filtering cell 52.

The stage 70 comprises at its input a switching member 72 of which one terminal is connected between the coil 54 and the capacitor 56. It further comprises a freewheel diode 74 connected between ground and the other terminal of the switching member 72. An energy storage coil 76 is connected to that same terminal of the switching member 72. A filter capacitor 78 connects the other terminal of the storage coil 76 to ground.

The output of the voltage reduction stage 70 is defined between ground and the connecting point of the coil 76 and the capacitor 78.

The regulating means 28 specific to the second shaping circuit 24 provide for a reduction in voltage in accordance with a variable division ratio, this being effected cyclically.

In particular the regulation action is adapted to reduce the voltage of 180 volts in accordance with a sinusoidal law so as to reconstitute at the output the positive parts of the sine curve wanted at the output but at a frequency of 120 Hz.

In order to ensure that progressive reduction in voltage the regulating means comprise a regulator 86 of pulse width modulation type (PWM). The output of the regulator 86 is connected to the control terminal of the switching member 72. The chopping frequency supplied by the regulator 86 is sufficiently high to be effectively filtered. It is for example fixed at 100 kHz. The input of the regulator 86 is connected to the center point of a variable-ratio voltage divider bridge 88.

The voltage divider bridge 88 comprises a measuring resistor 90 of which a first terminal is connected between the filtering capacitor 78 and the energy storage coil 76. The measuring resistor 90 is connected in series with a complementary resistive module of the voltage divider bridge whose resistance is variable in controlled fashion. That module is formed by an array of eight resistors 92 each connected in series with an individually controllable switching member 94. The arms which are formed in that way of a resistance arrangement in series with a switching member are connected in parallel between the second terminal of the measuring resistor 90 and ground.

In the illustrated example eight branches comprising a resistance are used. That number however may differ in dependence on the purity of the alternating signal that is wanted.

The control terminal of each of the switching members 94 is connected to its own output of a pilot control device 100 such as a microcontroller.

The pilot control device 100 is adapted for cyclic control of the switching members 94.

The repetition rate of the control signal which is applied to the switching members is equal to double the frequency of the alternating signal that is wanted at the output 16, namely 120 Hz.

The choice of the values of the resistors is such that the law for attenuation of the voltage in dependence on time which is imposed by the regulator 86 is homothetic of the function $att(x) = 1/\sin(2\pi F x)$ in which F is double the frequency of the alternating signal to be generated at the output 16, namely 120 Hz in the example being considered, and x is time.

Quantification of the function $att(x)$ is effected in such a way as to afford a good approximation to that function. It can be generated digitally by the microcontroller delivering control signals to the switching members 94 which are sequenced in respect of time in cyclic fashion.

The time interval between two successive switching operations in the resistive module is equal to the period of the sine curve to be generated, namely ⅙₀th of a Hz, divided by 32, if the successive time intervals are all identical. In an alternative configuration control by a variation in that time interval is effected to improve the level of precision of quantification of the attenuation law.

For example, in the case of a control involving a regular interval and with a reference voltage of 2.5 volts the following attenuation effects are obtained if TO represents the zero-crossing of the output sine curve.

of the regulator 86 is selected to be sufficiently high for that difference to remain small.

Thus, a signal formed by a succession of positive sinusoidal arches is obtained at the output of the voltage reduction stage 70. Its frequency is 120 Hz. That signal is subject to the sine law produced digitally by the successive switching operations of the switching members.

In dependence on imperfections in the circuits used, the attenuation law att(x) can be corrected in order to improve the spectral purity of the synthesised sinusoidal signal. It is possible for example to correct delays in propagation, asymmetries in the output bridge and linearity defects.

The signal obtained at the output of the voltage reduction stage 70 is formed by a succession of positive sine wave arches.

| T0 | T0 + 520 $\mu s$ | T0 + 1042 $\mu s$ | T0 +1563 $\mu s$ | T0 + 2083 $\mu s$ | T0 + 2604 $\mu s$ | T0 + 3125 $\mu s$ | T0 + 3646 $\mu s$ |
|---|---|---|---|---|---|---|---|
| 1 | 0.0825 | 0.0419 | 0.0289 | 0.0227 | 0.0193 | 0.0174 | 0.0164 |

A low pass filter 102 is disposed between the control input of the regulator 86 and the center point of the voltage divider bridge 88. That filter is adapted to eliminate the spectral components due to folding of the spectrum in the vicinity of the sampling frequency, that is to say thirty two times 60 Hz, that is to say 1920 Hz, in the example being considered here. That filtering frequency is taken as being equal for example to substantially ten times the frequency of the sinusoidal signal, that is to say about 500 Hz.

Finally the input terminals of a controlled inverter bridge 120 are connected at the output of the voltage reduction stage 70, that is to say to the terminals of the filtering capacitor 76. The terminals of the second output 16 are formed by the output terminals of the controlled inverter bridge 120.

On each of its four arms the inverter bridge 120 comprises a switching member 122 controlled in dependence on a control signal. That control signal which is produced by any suitable device is a logic signal synchronised with the arches of the desired sine curve. The frequency of that control signal is 120 Hz. It is advantageously generated by the microcontroller forming the pilot control device 100 of the divider bridge.

In operation of the power supply arrangement the conduction time of the switching member 32 is regulated in dependence on the voltage at the first output 14 of the apparatus.

Thus, regulation applied upstream of the transformer is ensured only in dependence on the output 14 supplying a dc voltage.

On the other hand, for alternating operation, regulation is effected only within the shaping circuit 24. That regulation is independent of the regulation implemented upstream of the transformer by the first regulating means 26.

In the course of a cycle the pilot control device 100 effects progressive switching of the different switching members 94 integrated into the voltage divider bridge 88 in order to modify the voltage applied at the input of the regulator 86. Thus, the width of the pulses produced upon closure of the switching member 72 under the control of the regulator 86 is proportional to the difference between the imposed reference which is fixed for example at 2.5 volts and the image of the sinusoidal signal attenuated by the law att(x). The gain The controlled inverter bridge 120 provides for inversion of one sine wave arch out of two, thus resulting in making alternating the signal supplied at the second output 16.

Inversion of the signal is effected at the zero-crossing of the synthesised sinusoidal signal.

Thus the solution proposed for the power supply to produce dc voltage and ac voltage from the alternating current from the distribution system makes it possible to use only a single transformer in which the two secondary windings are installed on the same magnetic circuit, being excited by the primary winding which is powered from the electrical distribution system.

The sinusoidal signal is generated by synthesis from a continuous signal formed at the output of the transformer.

As generation of power is effected by high-frequency chopping the circuits used are of small bulk and low weight which are compatible with an aeronautical environment. Indeed, direct conversion of the frequency of the distribution system to a frequency of 60 Hz would entail the use of bulky components which are difficult to render compatible with aircraft constraints.

The control arrangements used both for the direct current and for the alternating current permit very stable output voltages and frequencies, irrespective of the load, the latter being capable of varying very substantially.

Moreover, generation of the sinusoidal signal being effected digitally, it can be corrected in respect of imperfections in the circuits used, thus improving the output performances from the point of view of the rate of harmonic distortion.

Finally, generation of the sinusoidal signal being synthesised under the pilot control of a microcontroller, the power supply apparatus can be easily modified by a simple change in the control parameters of the microcontroller or by a modification in only some components such as the resistors 92.

In particular the ac voltage can be reduced to 100 volts instead of 110 volts and the frequency can be changed from 60 Hz to 50 Hz.

What is claimed is:

1. A power supply apparatus comprising:

an input for receiving an input electric current;

first and second outputs for providing first and second electric power supply currents each having specific characteristics; and means for conversion of the electric current connected between said input and said first and second outputs, said conversion means comprising a transformer comprising a primary winding supplied by said input electric current and first and second secondary windings respectively feeding said first and second outputs by way of first and second shaping circuits, said primary winding and said first and second secondary windings being disposed on the same magnetic circuit, said first shaping circuit comprising regulating means adapted to act on the electric current supplying said primary winding, said regulating means being adapted to ensure regulation in dependence on a signal from said first shaping circuit, said second shaping circuit comprising autonomous regulation means, comprising a regulation loop connected to said second output, for regulation of the current produced by said second output, said second shaping circuit being adapted to provide an alternating current, and said second shaping circuit comprising a rectification stage producing a voltage and, at the output of said rectification stage, modifying means for modifying the voltage in accordance with a variable division ratio.

2. Apparatus as set forth in claim 1, wherein said first shaping circuit is adapted to provide a direct current.

3. Apparatus as set forth in claim 1 wherein said modifying means for modifying the voltage in accordance with a variable division ratio comprise a regulator for the output voltage of said modifying means and control means for controlling said regulator on the basis of a variable control voltage.

4. Apparatus as set forth in claim 3, wherein said control means for controlling a variable control voltage comprise a variable-ratio voltage divider bridge connected at the output of said modifying means for modifying the voltage in accordance with a variable division ratio.

5. Apparatus as set forth in claim 1, wherein att the output to said modifying means for modifying the voltage in accordance with a variable division ratio, said second shaping circuit comprise an inverter bridge controlled at a predetermined frequency.

6. Apparatus as set forth in claim 1, wherein said modifying means for modifying the voltage in accordance with a variable division ratio, are adapted to produce a periodic signal at a frequency double the alternating current provided at said output of said second shaping circuit.

* * * * *